(12) United States Patent
Kyogaku et al.

(10) Patent No.: US 8,957,370 B1
(45) Date of Patent: Feb. 17, 2015

(54) IONIZATION APPARATUS, MASS SPECTROMETER INCLUDING IONIZATION APPARATUS, AND IMAGE FORMING SYSTEM

(71) Applicant: Canon Kabushiki Kaisha, Tokyo (JP)

(72) Inventors: Masafumi Kyogaku, Yokohama (JP); Yoichi Otsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/340,668

(22) Filed: Jul. 25, 2014

(30) Foreign Application Priority Data

Aug. 2, 2013 (JP) ................. 2013-160898

(51) Int. Cl.
*H01J 49/10* (2006.01)
*H01J 49/04* (2006.01)
*H01J 49/40* (2006.01)
*H01J 49/00* (2006.01)
*G01Q 10/06* (2010.01)

(52) U.S. Cl.
CPC ............. *H01J 49/0413* (2013.01); *H01J 49/40* (2013.01); *H01J 49/0459* (2013.01); *H01J 49/0004* (2013.01); *G01Q 10/065* (2013.01); *H01J 49/10* (2013.01)

USPC ........................................ 250/288; 250/423 R (58) Field of Classification Search
USPC ............................................. 250/288, 423 R
See application file for complete search history.

(56) References Cited

U.S. PATENT DOCUMENTS

| | | | |
|---|---|---|---|
| 8,710,436 B2 * | 4/2014 | Otsuka | ............................ 250/288 |
| 2013/0334030 A1 | 12/2013 | Otsuka et al. | |
| 2013/0341279 A1 | 12/2013 | Otsuka et al. | |
| 2014/0070093 A1 * | 3/2014 | Otsuka | ............................ 250/288 |
| 2014/0070094 A1 * | 3/2014 | Otsuka | ............................ 250/288 |

OTHER PUBLICATIONS

Yoichi Otsuka et al., "Scanning Probe Electrospray Ionization for Ambient Mass Spectrometry," 26(23) Rapid Commun. Mass Spectrom. 2725-2732 (Oct. 2012).

* cited by examiner

*Primary Examiner* — Kiet T Nguyen
(74) *Attorney, Agent, or Firm* — Fitzpatrick, Cella, Harper & Scinto (57) ABSTRACT

Provided is an ionization apparatus including: a holder configured to hold a sample; a probe configured to determine a part to be ionized of the sample held by the holder; an extract electrode configured to extract ionized ions of the sample; a liquid supply unit configured to supply liquid to a part of a region of the sample; and a unit configured to apply a first voltage between the probe and the extract electrode, in which the first voltage is pulse-modulated.

14 Claims, 8 Drawing Sheets

IONIZATION APPARATUS, MASS SPECTROMETER INCLUDING IONIZATION APPARATUS, AND IMAGE FORMING SYSTEM

BACKGROUND OF THE INVENTION

1. Field of the Invention

The present invention relates to an ionization apparatus for a solid sample, a mass spectrometer including the ionization apparatus, and an image forming system.

2. Description of the Related Art

There is a technology for ionizing a solid under the atmospheric pressure condition for component analysis of a surface of a solid sample.

In the document Yoichi Otsuka et al., "Scanning probe electrospray ionization for ambient mass spectrometry", Rapid Communications in mass spectrometry, 26, 2725 (2012), there is proposed an ionization method in which a very small volume of solvent is supplied to a very small region on a solid sample surface so that components of the sample are dissolved in the solvent, and then the components are ionized by an electrospray ionization method. The generated ions are introduced to a mass spectrometer so that a mass-to-charge ratio of the ion is measured, and hence the component analysis can be performed. In order to supply the solvent to the very small region of the solid sample surface, a probe is used. The solvent is continuously introduced to the probe. In a state where the probe is close to the solid sample surface, a liquid bridge is formed between the probe and the solid sample surface so that the components of the solid sample surface are dissolved in the liquid bridge. The solution in which the components are dissolved is ionized by applying a voltage thereto. The ionization method performed in the state where the probe stays close to the solid sample surface is referred to as contact-mode scanning probe electrospray ionization (contact-mode SPESI), and the ionization method performed in the state where the probe is vibrated so that the solvent is intermittently supplied to the solid sample surface is referred to as tapping-mode scanning probe electrospray ionization (tapping-mode SPESI).

In the above document, the probe is vibrated so that the probe is intermittently brought into contact with the sample surface, and hence the liquid bridge is intermittently formed. Therefore, a time period for forming the liquid bridge and a time period for ionizing are defined by a vibration condition of the probe such as vibration frequency, and hence cannot be determined freely. Therefore, depending on a condition such as the probe vibration or a solution flow rate, there is a problem in that when the components are consecutively measured by scanning the sample surface, sample components dissolved in the liquid bridge at a certain measurement point on the sample surface remain in another liquid bridge formed at a next measurement point, and hence the dissolved components at both measurement points cannot be analyzed correctly and separately.

SUMMARY OF THE INVENTION

According to one embodiment of the present invention, there is provided an ionization apparatus, including:
 a holder configured to hold a sample;
 a probe configured to determine a part to be ionized of the sample held by the holder;
 an extract electrode configured to extract ionized ions of the sample;
 a liquid supply unit configured to supply liquid to a part of a region of the sample; and
 a unit configured to apply a first voltage between a portion of the probe held in contact with a liquid bridge and the extract electrode,
 in which the first voltage is pulse-modulated.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

An ionization apparatus according to a first embodiment of the present invention includes a liquid supply unit for supplying solvent to a sample, a probe for forming a liquid bridge between the probe and the sample, an extract electrodeextract electrode for extracting ions, and a unit for applying a voltage between the probe and the extract electrodeextract electrode.

Figure 1:
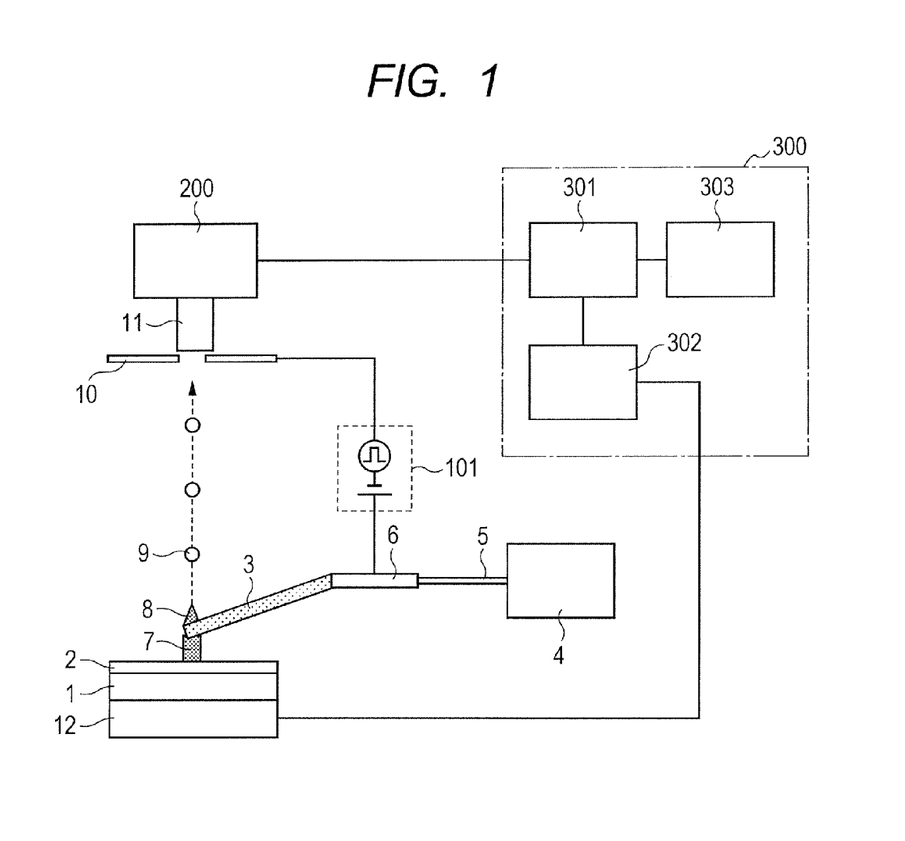
FIG. 1 is a schematic diagram illustrating an image forming system including an ionization apparatus according to a first embodiment of the present invention.

FIG. 1 is a schematic diagram illustrating an image forming system including the ionization apparatus according to the first embodiment of the present invention.

A sample 2 is placed on a holder 1 and is held by the holder 1. The sample 2 is a slice of a tissue (cells) of a living body or the like in this embodiment. The holder 1 is formed of a conductive material. The sample 2 may be placed on a flat substrate. In this case, a material of the substrate is appropriately selected from conductive or non-conductive materials in accordance with conductivity of the sample 2. If the sample 2 is conductive, it is preferred to select a non-conductive substrate, but the substrate does not always need to be non-conductive.

A probe 3 has a needle-like shape, and an end portion thereof is arranged to be held in contact with the sample 2 or be very close to the sample 2 as illustrated in FIG. 1. A position of the probe 3 determines a part of the sample 2 to be ionized. The probe 3 has a flow path inside, and has a cylindrical shape, for example. An end portion of the probe 3 has an opening. The solvent continuously flows out of the opening so that the probe 3 supplies the solvent onto the surface of the sample 2. The solvent is continuously supplied to the probe 3 from a liquid supply unit 4 through a connection pipe 5 and a conductive pipe 6.

The solvent is a liquid that can dissolve substances contained in the sample 2 as a solute, and the solvent containing the dissolved solutes is referred to as "solution" in the following description. It is preferred that the solvent be a mixture of water and organic solvent, and it is more preferred that at least one of acid or base be further mixed. However, the solvent may simply be water or organic solvent. When the mixture as the solvent is brought into contact with the sample, substances contained in the sample that are easily dissolved in the solvent (at least one of lipid, sugar, or molecules having an average molecular weight of 20 or more and less than 100,000,000) is easily dissolved so that the liquid as the solvent is changed to the solution.

Here, a dissolved state means a state where molecules, atoms, and micro particles are dispersed in the solvent. Examples of the substance that is easily dissolved include lipid molecules constituting a cell membrane, sugar contained in a cell, and floating protein.

The solvent supplied from the probe 3 forms a liquid bridge 7 between the end portion of the probe 3 and the sample 2. The liquid bridge 7 is liquid forming a bridge between the probe 3 and the sample 2 under the atmospheric pressure condition and maintains the bridge state by surface tension and the like. When the liquid bridge 7 is formed, substances of the surface of the sample 2 are dissolved in the liquid. A contact area between the liquid bridge 7 and the sample 2 is approximately $1 \times 10^{-8}$ m$^2$. In other words, the liquid bridge 7 is formed in a very narrow region on the surface of the sample 2.

For instance, a size of the probe 3, a material of the probe 3, a size of the flow path, and a flow rate of the solvent are selected as follows.

A length of the probe: from 10 μm to 100 mm

A diameter of the probe: outer diameter of from 1 μm to 5 mm

A material: glass, stainless steel, silicon, or PMMA

A size of the flow path: flow path sectional area of from 1 μm$^2$ to 1 mm$^2$

A flow rate of the solvent: from 1 nL/min to 100 μL/min

The probe 3 or the conductive pipe 6 and an extract electrodeextract electrode 10 are connected to a first voltage applying unit 101 and are applied with a first voltage. A distance between the distal end of the probe 3 and the extract electrodeextract electrode 10 is 10 mm or less.

The probe 3 is made of a conductive or non-conductive material. If the probe is a conductor, the first voltage applying unit 101 can be directly connected to the probe 3. On the other hand, if the solvent is conductive, a non-conductive probe may be used. In this case, however, it is necessary to arrange a conductive member at any part in the flow path from the liquid supply unit 4 to the probe 3, and to apply a voltage to the conductive member. Here, the conductive pipe 6 is arranged, and the first voltage applying unit 101 is connected to the conductive pipe 6. The voltage supplied from the first voltage applying unit 101 is applied, through the conductive solvent, to the probe 3 as well as the solvent flowing out of the distal end of the probe. Such case may also be expressed that the voltage is applied to the probe in the following description.

In addition, if the sample 2 has a low conductivity and a good conductor is selected for the holder 1, the holder 1 may be electrically connected to the probe 3 or to the conductive pipe 6 so as to have the same electric potential.

The extract electrodeextract electrode 10 has a structure including a conductive member and has a flat-plate shape or a cylindrical shape. When the first voltage applying unit 101 applies the first voltage, a high electric field due to electric field concentration is formed at the distal end portion of the probe 3 because of a structure of the probe 3 having a high aspect ratio so that a part of the liquid forms Taylor cone 8. The extract electrodeextract electrode 10 is used for extracting charged liquid drops 9 or ions discharged from a distal end portion of the Taylor cone 8.

The Taylor cone 8 has a shape extending toward the extract electrodeextract electrode 10 like a cone. At the distal end of the Taylor cone 8, the charged liquid is torn off to be excessively charged liquid drops 9. The liquid drops 9 are sprayed toward the extract electrode 10 by Coulomb force. Further, a series of processing including formation of the Taylor cone, spraying of the charged liquid drops, and ionization is correctively referred to as electrospray ionization in the following description.

The first voltage is set to a voltage that can generate a high electric field sufficient for generating the Taylor cone of the liquid at the distal end portion of the probe 3. The first voltage is a high voltage that is usually from 1 kV to 10 kV, and is preferably from 3 kV to 5 kV. However, as a distance between the probe 3 and the extract electrode 10 is smaller, a voltage necessary for obtaining electric field intensity for generating the Taylor cone 8 becomes lower. In this case, the first voltage may be a voltage lower than 1 kV.

A polarity of the first voltage is switched in accordance with a polarity of a target ion charge. When detecting a positive charge ion, the extract electrode is set to have a relatively low potential. When detecting a negative charge ion, the extract electrode is set to have a relatively high potential. A reference potential may be set arbitrarily, and the extract electrode may be connected to the ground, or the probe 3 is connected to the ground. However, because an electrostatic capacitance between the extract electrode 10 and the ground of the measurement system is large, it is preferred that the extract electrode 10 have a constant potential with respect to the ground potential from a viewpoint of voltage responsiveness when a pulse voltage is applied as described later.

The solvent forming the liquid bridge 7 becomes the solution in which the substances contained in the sample are dissolved, and a part of the solvent moves on the distal end portion of the probe 3 so as to form the Taylor cone 8. In other words, the liquid forming the Taylor cone 8 includes the solution in which the substances contained in the sample 2 are dissolved. As described above, in the ionization apparatus of the present invention, formation of the liquid bridge and ionization of the substances are performed by the same probe.

The extract electrode 10 is provided with an opening and is further connected to a mass spectrometry unit 200 via an introduction path 11. The introduction path 11 has a thin cylindrical shape, for example. The mass spectrometry unit 200 and the introduction path 11 are connected to a vacuum pump (not shown) to have a negative pressure with respect to the external environment. Therefore, in both states of liquid phase and gas phase, ions are attracted by the extract electrode 10 together with gas molecules in an atmosphere surrounding the ions, and pass the extract electrode 10. Then, in the mass spectrometry unit 200, the ions fly in the vapor phase. The substances contained in the liquid drop 9 are introduced in the mass spectrometry unit 200 in the ionized state. The mass spectrometry unit 200 measures a mass-to-charge ratio of the ion. Further, the extract electrode 10 may have a structure integral to the introduction path 11 or a apparatus body for maintaining a vacuum in the mass spectrometry unit 200.

Figure 2:
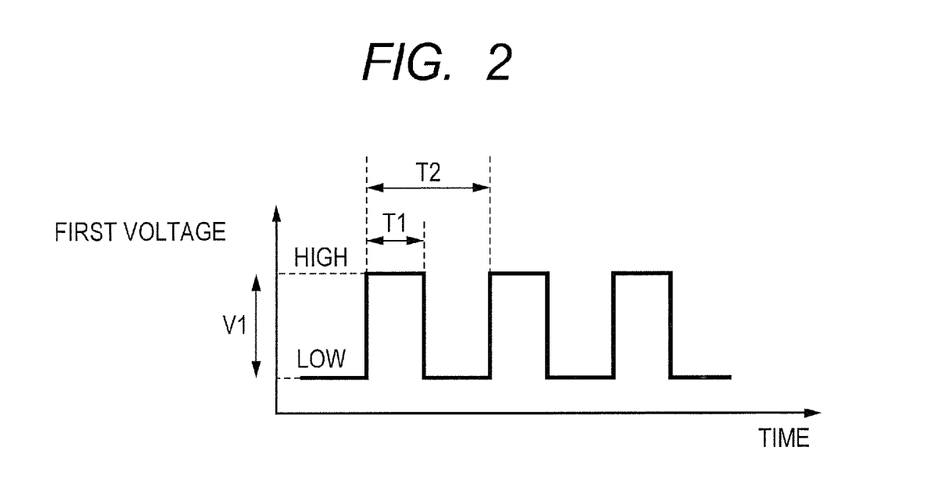
FIG. 2 is a chart showing a voltage application timing according to the first embodiment.

In the present invention, the first voltage applied between the probe 3 and the extract electrode 10 is pulse-modulated and is intermittently applied. FIG. 2 shows a manner of application of the first voltage. Here, pulse modulation means to generate a high potential state intermittently with respect to a low potential state so as to repeatedly generate a pulse voltage. A pulse time T1 and a pulse interval T2 can be set arbitrarily. T1 may be set sufficiently shorter than T2, or T2 may be set shorter than T1. Usually, it is preferred to apply a pulse at a constant pulse interval, namely, at a constant frequency, but it is possible to set T1 and T2 to be changed in order. The polarity of the first voltage is set so that the extract electrode side becomes negative when detecting the liquid drop charged positively or positive ions, and is set so that the extract electrode side becomes positive when detecting negative ions.

When the pulse voltage is high, a strong electric field is induced at the distal end of the probe 3. Therefore, the Taylor cone is generated so that ions are discharged. However, when the pulse voltage is low, ions are not generated. In this way, it is possible to control ON/OFF of ion discharge by intermittently applying the voltage.

In addition, it is possible to apply a low DC offset voltage in a superposed manner without connecting the extract electrode 10 and the introduction path 11 to the ground. For instance, when detecting positively charged liquid drops, a voltage relatively higher than the mass spectrometry unit 200 by approximately a few tens volts is applied to the extract electrode 10 as the offset voltage. Then, the positively charged liquid drop can be prevented from adhering to the extract electrode 10, and hence can be efficiently sent to the mass spectrometry unit 200.

In the period during which the pulse voltage is applied, the solvent supplied from the probe 3 is moved to form mainly the Taylor cone 8 and is discharged as the charged liquid drop 9. On the other hand, an amount of the solvent moving for forming the liquid bridge 7 in this case is decreased. In a condition where a supplying amount of the solvent to the probe 3 is small, the liquid bridge 7 is hardly formed. On the other hand, when the pulse voltage is low, the solvent supplied from the probe 3 is moved for forming the liquid bridge 7 by the surface tension or the like, and components of the sample surface are dissolved in the liquid bridge 7. Next, when the pulse voltage becomes high, the solution forming the liquid bridge 7 is attracted by the strong electric field to the side of the distal end of the probe 3 opposite to the sample surface to become a part of the solution forming the Taylor cone 8.

Further, a length of T2 and a size of the liquid bridge are associated with each other, and further the size of the liquid bridge is associated with a size of the ionized region. In other words, the length of T2 determines a spatial resolution of a mass distribution image described later. Therefore, if a moving speed of the sample described later is the same, as T2 is shorter, the size of the liquid bridge becomes smaller so that the spatial resolution is improved.

In this embodiment, T2 can be set to an arbitrary value, which is preferably in a range of from 1 msec to 1 sec. In this case, T1 can be set arbitrarily in a range satisfying T1<T2, but it is preferred to set T1 to T2/2 or less. When T1 is sufficiently short as T2/10 or less, a formation time of the liquid bridge can be sufficiently longer than a formation time of the charged liquid drop.

As described above, by applying the voltage intermittently and by arbitrarily controlling a voltage application time period, it is possible to dissolve the components of the sample surface and form the charged liquid drop in a clearly separated manner. In addition, by securing a long time period for forming the charged liquid drop, it is possible to suppress mixing of components dissolved at different measurement points on the sample surface at a timing of applying a next voltage so as to perform mass spectrometric analysis.

Further, as a result of the voltage application, the probe 3 may be vibrated. When the voltage is intermittently applied, the probe 3 is intermittently deformed by Coulomb force, and consequently the vibration may occur. In this case, if the application of the first voltage is performed when the distal end of the probe 3 is farthest from the surface of the sample 2, the electric field intensity can be most increased so that the ionizing can be performed easily.

The image forming system according to the first embodiment includes a mass spectrometer and an image forming apparatus 300. Here, the mass spectrometer includes the above-mentioned ionization apparatus as an ionization unit and the mass spectrometry unit 200. In addition, the image forming apparatus 300 for forming image information includes an image forming unit 301, a position specifying unit 302, and an image display unit 303 (FIG. 1).

As described above, the liquid bridge 7 is arranged in the very narrow region on the surface of the sample 2. In order to analyze a wider area on the surface of the sample, the ionization apparatus further includes a moving unit 12 for scanning the sample 2 in the direction parallel to the sample surface. The moving unit 12 is connected to the position specifying unit 302. The moving unit 12 moves the holder 1 in accordance with position information specified by the position specifying unit 302. Further, because formation of the liquid bridge 7 and formation of the charged liquid drop 9 or ionization are not simultaneously performed, position coordinates on the surface of the sample 2 to be analyzed are calculated based on the moving speed of the holder 1 and the time when the pulse is applied.

A result of the mass spectrometric analysis is obtained by the mass spectrometry unit 200 as mass information such as mass spectrum data. The image forming unit 301 integrates mass spectrum data and the position information from the position specifying unit 302 so as to form image information. The image information may be a two-dimensional image or a three-dimensional image. The image information output from the image forming unit 301 is sent to the image display unit 303 such as a display and is displayed as an image.

From the result of the mass spectrometric analysis, it is possible to know components of the solutes dissolved in the liquid bridge. Therefore, the image constitutes a component distribution image or a mass distribution image. On the image, types and amounts of the components are displayed, for example. Differences in types and amounts of the components are displayed by colors or brightness, for example. In addition, it is also possible to display the mass distribution image in an overlaid manner with an optical microscope image of the sample that is acquired in advance.

The ionization apparatus according to this embodiment has a structure in which the probe 3 has the flow path inside, and the solvent flows in the flow path. However, the solvent may be supplied from the liquid supply unit 4 to the probe 3, and the solvent may move along the surface of the probe 3 so that the distal end of the probe 3 forms the liquid bridge 7.

The ionization apparatus according to this embodiment may be used as an ion generating unit of a mass spectrometer such as a time-of-flight mass spectrometer, a Quadrupole mass spectrometer, a magnetic deflection mass spectrometer, an ion trap mass spectrometer, or an ion cyclotron resonance mass spectrometer.

The ionization apparatus according to this embodiment forms the liquid bridge under the atmospheric pressure condition so as to ionize the substances, and the atmospheric pressure means a range of from 0.1 to 10 times of the normal atmospheric pressure of 101,325 Pa. In addition, the condition may be the same atmosphere as in the normal room or in an inert gas atmosphere such as a nitrogen atmosphere or an argon atmosphere.

Second Embodiment

Figure 3:
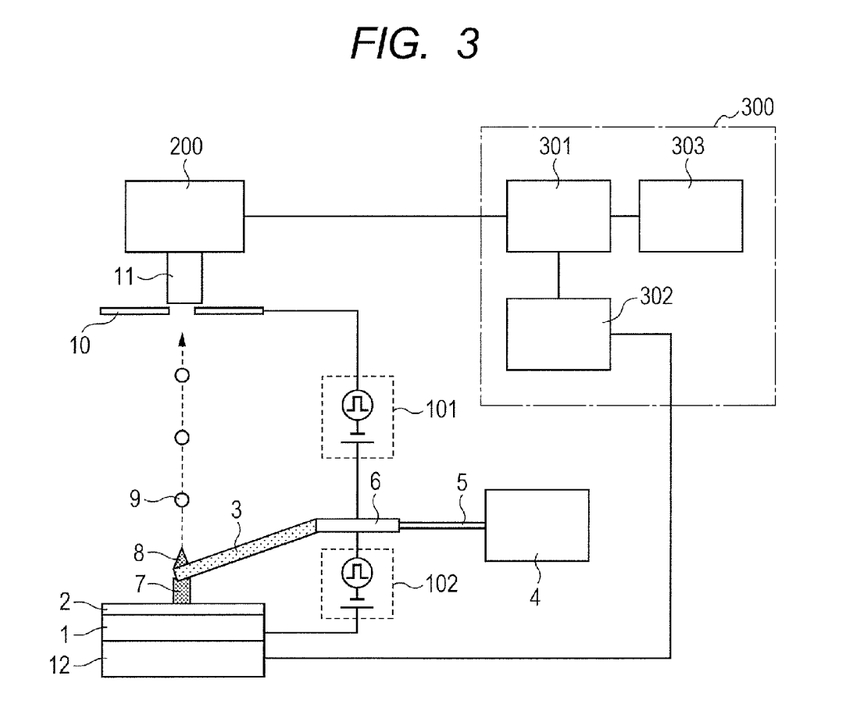
FIG. 3 is a schematic diagram illustrating an image forming system including an ionization apparatus according to a second embodiment of the present invention.
Figure 4A:
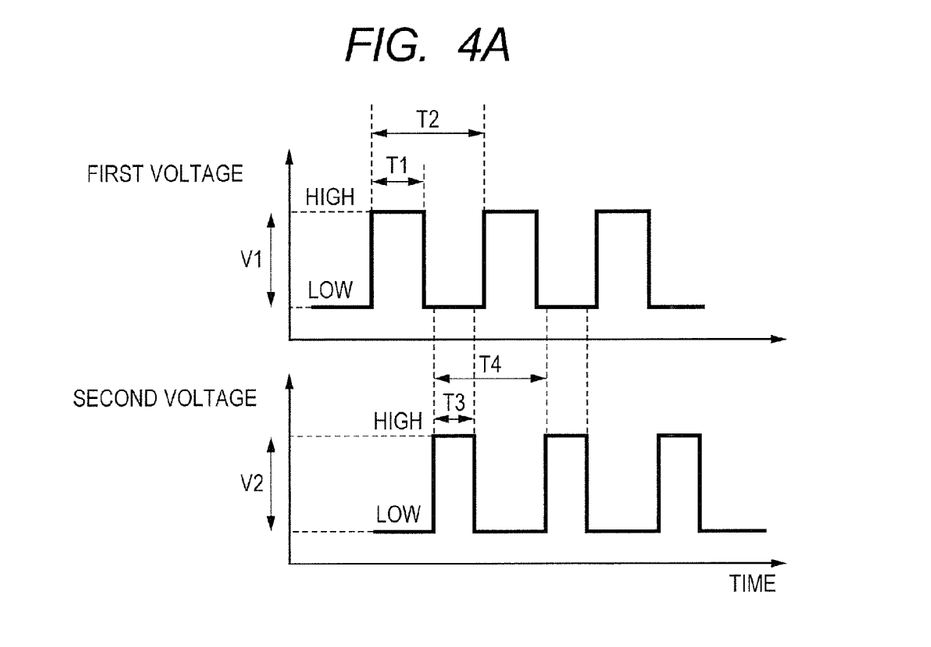
FIGS. 4A and 4B are charts showing voltage application timings according to the second embodiment.
Figure 4B:
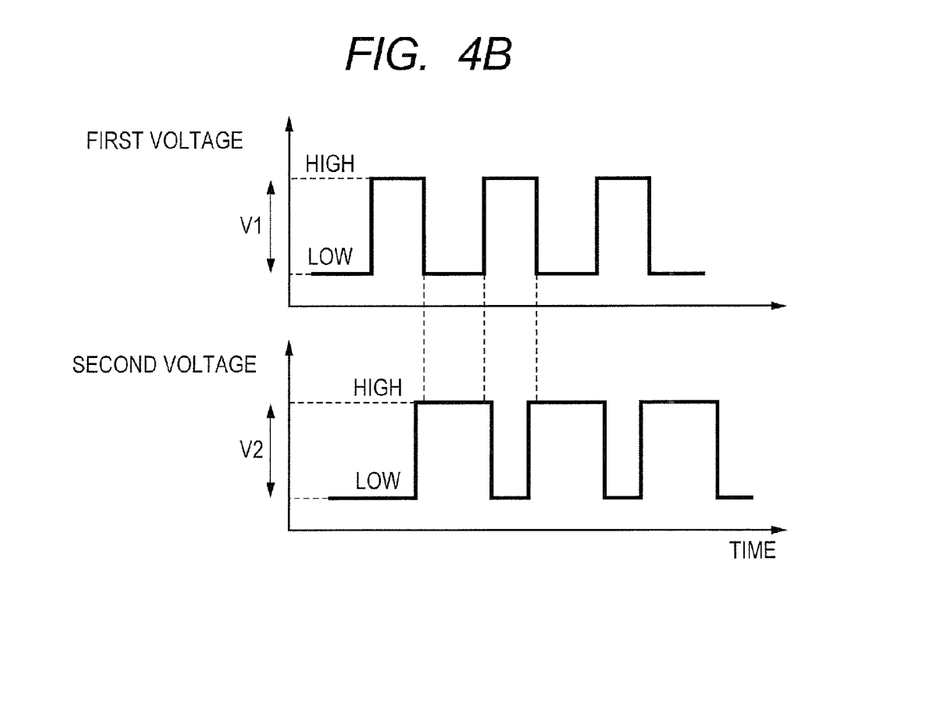

FIG. 3 is a schematic diagram illustrating an ionization apparatus according to a second embodiment of the present invention. In addition, FIGS. 4A and 4B show timings at which the voltage is applied.

In the second embodiment, in order to apply the voltage between the probe 3 or the solvent introduced to the probe 3 and the holder 1, a second voltage applying unit 102 is connected. Other structures are the same as those in the first embodiment.

The second voltage applying unit 102 is connected between the probe 3 or the solvent introduced to the probe 3 and the holder 1, and a pulse-modulated second voltage is intermittently applied. A pulse time of the second voltage is T3, and a time interval between pulses is T4. The second voltage is set to a few tens volts or lower. In addition, in parallel thereto, similarly to the first embodiment, the first voltage applying unit 101 applies the first voltage between the probe 3 and the extract electrode 10. T4 is basically set to the same value as T2.

As an application polarity of the second voltage, a potential of the probe 3 may be relatively higher or lower than a potential of the holder 1. However, if the second voltage is applied at the same time when the first voltage is applied, it is preferred to define a potential relationship. When detecting a positive ion, it is preferred to set the potentials so as to satisfy the relationship "potential of the extract electrode 10<potential of the conductive pipe 6<potential of the holder 1". In addition, when detecting a negative ion, the potentials of the structural elements are set so as to satisfy the potential relationship opposite to the above relationship.

In the period during which the second voltage is applied, a strong electric field is generated between the distal end of the probe 3 and the holder 1 or the surface of the sample 2. Therefore, the solution at the distal end of the probe is attracted to the sample surface. As a result, a volume of the liquid bridge 7 changes in accordance with the voltage. In addition, when the second voltage is not applied, the liquid bridge 7 is formed only by the surface tension. Therefore, the volume of the liquid bridge 7 is decreased. In other words, as the voltage is higher, the volume of the liquid bridge 7 and the area on the surface of the sample 2 are increased. Alternatively, if the sample surface has a higher hydrophilic property, a flow of the liquid to the sample surface is increased. In this way, by changing the voltage to be applied, it is possible to control the formation of the liquid bridge.

In this embodiment, the probe 3 is extremely close to the surface of the sample 2 while the distance between the probe 3 and the extract electrode 10 is relatively large. In this structure, it is necessary that the first voltage is sufficiently large to such an extent that the Taylor cone is formed. On the other hand, it is necessary that the second voltage is sufficiently lower than the first voltage so that the probe, the sample, or the like is not damaged by discharge or an excess current thereof.

In this embodiment, the pulse-modulated first voltage and the pulse-modulated second voltage are applied in synchronization with each other. As shown in FIGS. 4A and 4B, after the application of the first voltage is finished, the second voltage is applied. The first voltage and the second voltage are intermittently applied and are preferably not applied at the same time as shown in FIG. 4A. In this case, after the application of the first voltage is finished, the application of the second voltage is finished. In addition, as shown in FIG. 4B, there may be a little overlap between the application of the first voltage and the application of the second voltage. In an example of FIG. 4B, before the application of the first voltage is finished, the application of the second voltage is started. In both cases, there is set a time period in which only one of the first voltage and the second voltage is applied. In this way, by alternately applying the first voltage and the second voltage, the solvent supplied from the probe 3 flows alternately in the direction of forming the liquid bridge 7 and in the direction of forming the Taylor cone 8. In other words, the formation of the liquid bridge 7 and the discharge of the charged liquid drop 9 can be performed intermittently and alternately.

In addition, the pulse time width and the time interval between pulses of the first voltage and the second voltage are synchronized and optimally set. If the pulse application time of the first voltage is set sufficiently long, a discharge time of the charged liquid drop becomes long so that all the solution in which the components are dissolved can be discharged as the charged liquid drop. As a result, when the next liquid bridge is formed, it is possible to suppress mixing of the remaining components dissolved the last time. In this case, if the pulse application time of the second voltage is set short, it is possible to suppress dissolving of the components into the liquid bridge.

Also, in this embodiment, with scanning by the probe, it is possible to suppress mixing of components (derived) from different positions on the sample surface in the solution, to thereby perform the component analysis. Therefore, a decrease of the spatial resolution can be reduced.

Further, the second voltage may be a DC voltage. An electric field formed by the DC voltage causes the solvent supplied to the distal end of the probe 3 to be attracted by the surface of the sample 2 so that the liquid bridge 7 can be efficiently formed.

Third Embodiment

Figure 5:
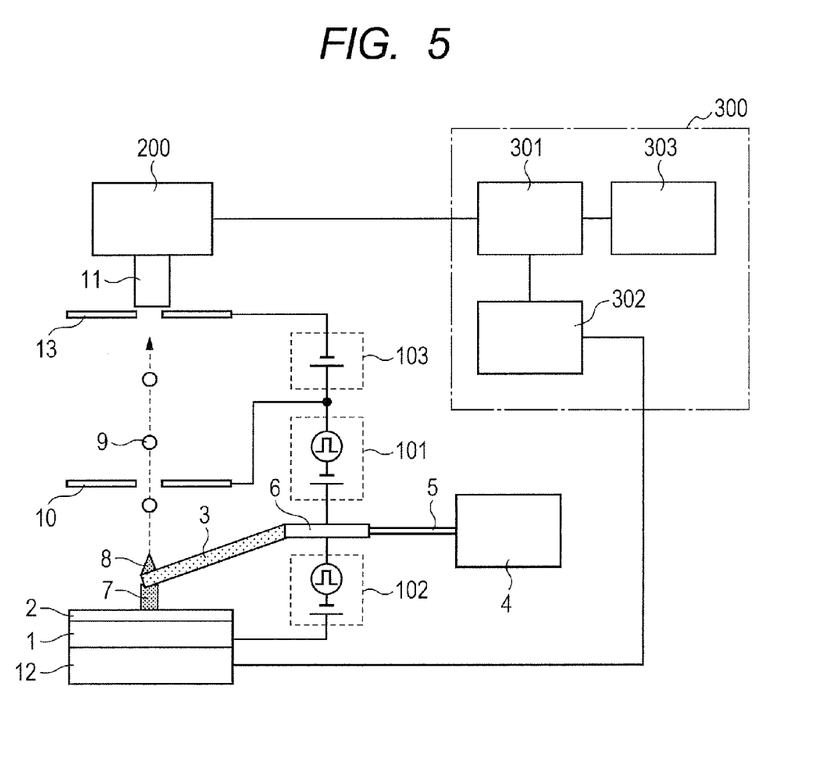
FIG. 5 is a schematic diagram illustrating an image forming system including an ionization apparatus according to a third embodiment of the present invention.

FIG. 5 is a schematic diagram illustrating an ionization apparatus according to a third embodiment of the present invention. In this embodiment, compared with the second embodiment, the extract electrode 10 is separated from the introduction path 11 and is arranged at a position closer to the probe 3. Further, a intake electrode 13 is arranged close to the introduction path.

The first voltage applying unit 101 is connected between the extract electrode 10 and the conductive pipe 6 so that the first voltage is intermittently applied. A third voltage applying unit 103 is connected between the intake electrode 13 and the extract electrode 10 so that a third voltage is applied. The third voltage is a DC voltage. In addition, the second voltage applying unit 102 is connected between the conductive pipe 6 and the holder 1 so as to apply the second voltage. Other structures are the same as those in the first and second embodiments, and hence the detailed description thereof is omitted.

When the first voltage is applied, the Taylor cone 8 is formed at the distal end portion of the probe 3, and the charged liquid drop 9 is discharged from the distal end of the Taylor cone 8. The charged liquid drop 9 passes through the opening formed in the extract electrode 10. The charged liquid drop 9 reaches the intake electrode 13 in accordance with the electric field between the extract electrode 10 and the intake electrode 13, and further passes through an opening formed in the intake electrode 13 and the introduction path 11 so as to reach the mass spectrometry unit 200.

A distance between the extract electrode 10 and the distal end of the probe 3 is set to 5 mm or less and is preferably set to 2 mm or less. A peak value of the first voltage is set to a voltage at which the Taylor cone is formed, and is typically set to 1 kV or lower. If the distance between the probe 3 and the extract electrode 10 is close to 1 mm or less, the peak value can be set to a low value of approximately a few tens volts to a few hundreds volts. If a lower voltage can be set, a risk of damaging the apparatus due to the discharge can be reduced.

The third voltage is set so that the potential of the intake electrode 13 becomes lower than the potential of the extract electrode 10 in the low state when detecting a positive ion, for example. This is for purpose of efficiently guiding ions after passing the extract electrode 10 to the intake electrode 13. When detecting a positive ion, it is preferred to set the potentials so as to satisfy the relationship "potential of the intake electrode 13<potential of the extract electrode 10<potential of the conductive pipe 6<potential of the holder 1". The reference potential may be set arbitrarily. In addition, when detecting a negative ion, the potentials of the structural elements such as the extract electrode 10 are set so as to satisfy the potential relationship opposite to the above relationship.

The voltage application timing is the same as shown in FIGS. 4A and 4B described above in the second embodiment. In addition, actions such as formation of the liquid bridge and formation of the Taylor cone due to the voltage application are also the same as those described above in the second embodiment.

Also, in this embodiment, the probe 3 is extremely close to the surface of the sample 2 while the distance between the probe 3 and the extract electrode 10 is sufficiently large. In addition, it is necessary that the first voltage is sufficiently large to such an extent that the Taylor cone is formed. On the other hand, the second voltage is set sufficiently lower than the first voltage so that the probe, the sample, or the like is not damaged by the discharge or the excess current.

Also, in this embodiment, with scanning by the probe, it is possible to suppress mixing of substances due to different positions on the sample surface in the solution. Therefore, components can be correctly separated for analysis, and hence a decrease of the spatial resolution can be reduced.

Fourth Embodiment

Figure 6:
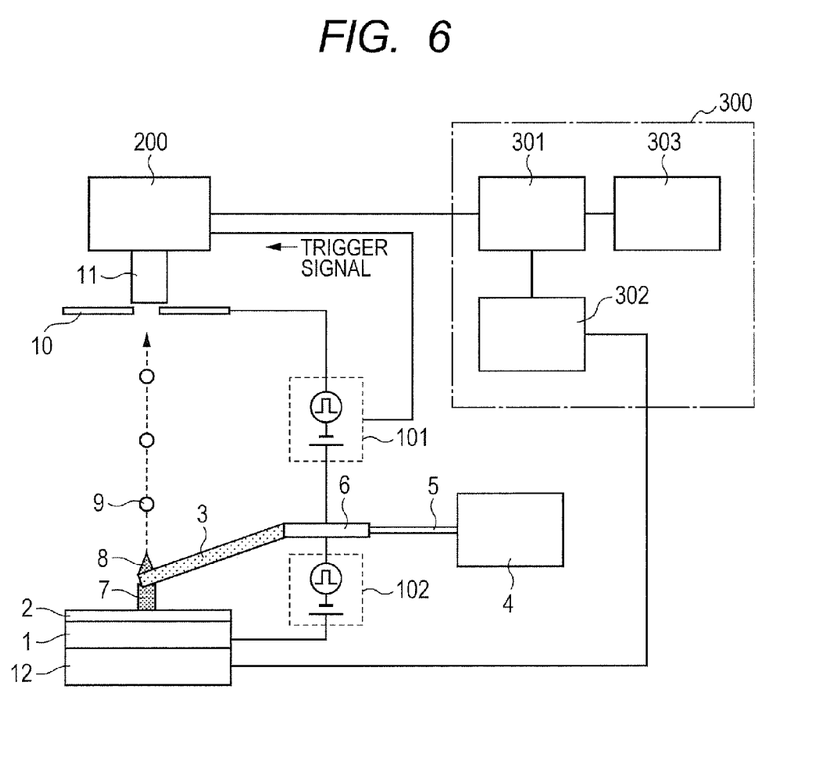
FIG. 6 is a schematic diagram illustrating an image forming system including an ionization apparatus according to a fourth embodiment of the present invention.
Figure 7:
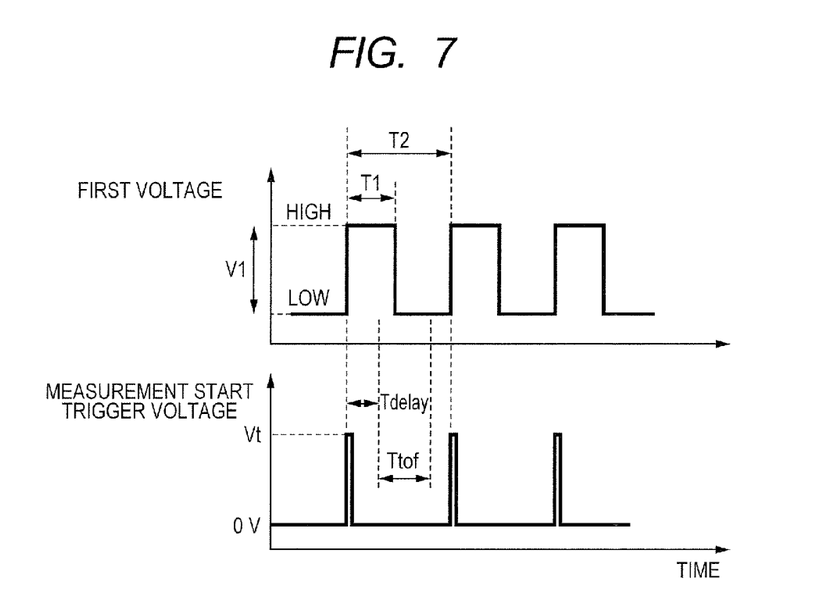
FIG. 7 is a chart showing a voltage application timing and a trigger generation timing according to the fourth embodiment.

FIG. 6 is a schematic diagram illustrating an ionization apparatus according to a fourth embodiment of the present invention. In addition, FIG. 7 shows a timing of the voltage application and a timing of generating a trigger signal. The trigger signal is generated in synchronization with generation of ions. In this embodiment, the trigger signal output from the first voltage applying unit 101 is input to the mass spectrometry unit 200, and the mass spectrometer 200 performs the mass spectrometric analysis in synchronization with generation of ions. Other structures are the same as those in the second embodiment, and hence the detailed description thereof is omitted.

As the mass spectrometry unit 200, it is possible to use various mass spectrometers such as a time-of-flight mass spectrometer, a Quadrupole mass spectrometer, a magnetic deflection mass spectrometer, a double-focusing mass spectrometer, an ion trap mass spectrometer, an ion cyclotron resonance mass spectrometer, and the like.

In this embodiment, the trigger signal is generated at the time point when the first pulse voltage is applied. At the same time as the application of the first pulse voltage, the charged liquid drop is discharged from the distal end of the probe and starts to fly toward the extract electrode 10. The charged liquid drop is further split in the process of being introduced to the mass spectrometry unit 200, and the components contained in the liquid drop 9 are ionized. The mass spectrometry unit 200 starts the mass spectrometric analysis when receiving the trigger signal. A result of the mass spectrometric analysis is sent to the image forming unit 301. Further, the trigger signal may be generated at a time point delayed from the generation time point of the first pulse voltage by a certain time.

For instance, in the case of the quadrupole mass spectrometry, the trigger signal is synchronized with electric field sweep on an ion path. In the case of the magnetic deflection or double-focusing mass spectrometry, the trigger signal is synchronized with magnetic field sweep of a sector ion deflector.

Next, there is described an example in which a time-of-flight mass spectrometric analysis unit using a time-of-flight (TOF) method is used as the mass spectrometry unit 200. In the TOF method, ions introduced to an accelerator (not shown) are accelerated by an electric field and then are introduced to a flight tube. A flight time of the ions flying at a constant speed in the flight tube is measured so that the mass-to-charge ratio of the ion is measured.

The mass spectrometry unit 200 measures the time until the ion reaches a detector (not shown) inside the mass spectrometry unit with a time reference of the trigger signal. In this case, with respect to generation of the trigger signal, the application timing of the acceleration electric field to the ion accelerator in the mass spectrometry unit is appropriately adjusted. In synchronization with the trigger signal, the electric field is applied by the accelerator so as to accelerate the ions, and then measurement of the time of flight is started. However, what is necessary for determining mass of ion is only the time of flight of the ion flying inside the flight tube (not shown) in the mass spectrometry unit. Therefore, time Tdelay from generation of the trigger signal until the ion reaches an entrance of the flight tube is appropriately estimated and subtracted from ion detection time.

In addition, it is necessary to prevent a signal of an ion generated by application of the first pulse voltage at a certain time point from mixing to a signal of an ion generated by another pulse voltage applied next in the mass spectrometer. Therefore, the pulse interval T2 of the first voltage is set to be longer than measured time Ttof of the time of flight of an ion to be measured.

As described above, in this embodiment, dissolving of components and ionizing are intermittently performed, and the ionizing timing is synchronized with the timing of the mass spectrometric analysis. Thus, mixing of mass spectrometric analysis information of components dissolved on neighboring measurement positions on the sample surface can be reduced. In addition, because the mass spectrometric analysis is performed only when the charged liquid drop is discharged or when the ions are generated, an S/N ratio of the signal is improved. Thus, it is possible to perform the mass spectrometric analysis with high accuracy so that a mass distribution image with high spatial resolution can be obtained.

Fifth Embodiment

Figure 8:
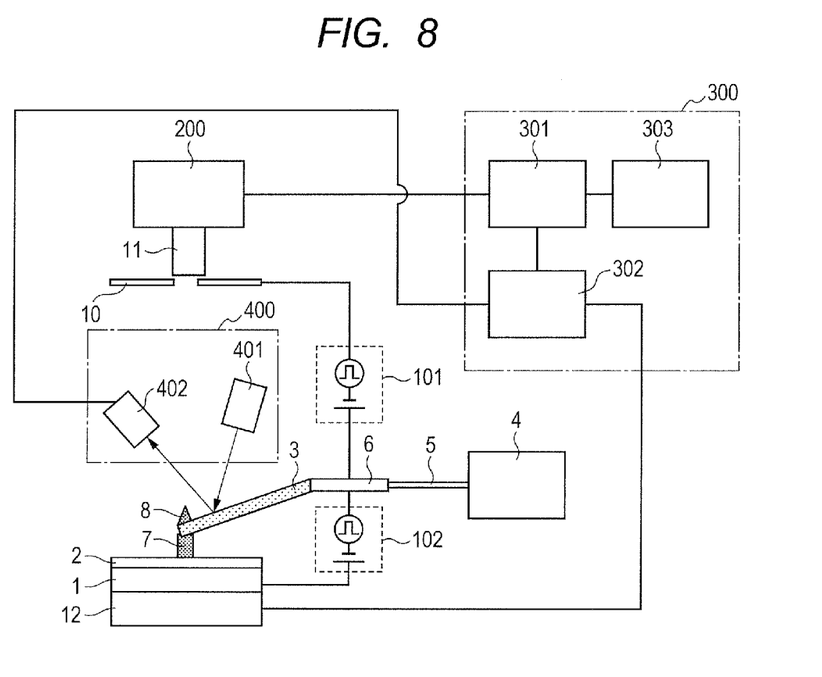
FIG. 8 is a schematic diagram illustrating an image forming system including an ionization apparatus according to a fifth embodiment of the present invention.

FIG. 8 is a schematic diagram illustrating an ionization apparatus according to a fifth embodiment of the present invention. This embodiment includes a displacement measuring unit 400 for measuring a displacement of the probe or the sample surface. Other structures are the same as those in any one of the first to fourth embodiments, and hence the detailed description thereof is omitted.

In this embodiment, the moving unit 12 has a displacement function in a Z direction perpendicular to the surface of the sample 2 in addition to a displacement in the direction parallel to the surface of the sample 2. When receiving a signal from the displacement measuring unit 400, the position specifying unit 302 performs a feedback control of a position in the Z direction for the moving unit 12. By performing the control so that the signal becomes constant, the distance between the probe 3 and the surface of the sample 2 can be maintained to be substantially constant. Thus, it is possible to stabilize a formation time or formation amount of the liquid bridge 7. In addition, because application of an excessive force to the sample can be avoided, it is possible to scan the sample surface stably so as to ionize components of the sample surface.

The displacement measuring unit 400 in this embodiment can adopt a structure using various methods as described below, but the methods described in this embodiment are not limitations.

When the distal end of the probe 3 approaches and is brought into contact with the surface of the sample 2, or when the liquid bridge 7 is formed, an adhesion force is generated to warp the probe. When a formation state of the liquid bridge varies in accordance with the distance between the surface of the sample 2 and the distal end of the probe 3, the adhesion force is changed so that a warp amount of the probe is changed. By performing the feedback control of the moving unit 12 so that the warp amount of the probe 3 becomes constant, the adhesion force or the distance between the probe and the sample surface can be maintained to be constant.

As a method of detecting the warp of the probe 3, an optical lever method, an optical interference method, or the like can be applicable. It is possible to use a method in which the probe 3 is made of a piezoelectric material, and a voltage generated in accordance with a displacement of the probe 3 is detected.

In the displacement measuring unit 400 using the applied optical lever method, a laser beam emitted from a light irradiation device 401 irradiates the probe 3 on the back side, and reflected light is detected by an optical detector 402 so that the warp amount of the probe 3 is detected from a displacement of a position of the light detected by the optical detector 402. Further, it is possible to arrange a reflection mirror (not shown) on an optical path in order to facilitate optical path adjustment.

Further, in order to precisely maintain the distance between the probe 3 and the surface of the sample 2 to be constant, it is possible to further use the method described below.

A slight vibration is given to the probe 3, and a warp of the probe 3 is detected by the displacement measuring unit 400 so that a vibration frequency of the probe 3 is detected. By applying an AC voltage having a constant frequency to the probe 3, the probe 3 vibrates due to an electrostatic force. Alternatively, a mechanical unit such as a piezoelectric element may be used to vibrate the probe 3. When the distance between the distal end of the probe 3 and the surface of the sample 2 varies, the adhesion force of the liquid bridge 7 is varied. Therefore, the vibration frequency or amplitude of the probe 3 varies. The feedback control of the displacement in the Z direction of the moving unit 12 is performed so as to maintain the vibration frequency or amplitude of the probe 3 to be constant.

The pulse-modulated first or second voltage is applied to the probe in the first to fourth embodiments. Also, in this case, the probe 3 is displaced due to the warp. It is possible to detect the displacement of the probe 3 and to perform the feedback control of the displacement in the Z direction for the moving unit 12 by using the detection signal. Alternatively, when an AC voltage having a constant frequency is applied between the probe 3 and the holder 1 besides the pulse-modulated voltage as described above, it is necessary to separate a displacement of the probe 3 due to the pulse voltage from a displacement due to the AC voltage. For this purpose, there is a method of using a frequency filter, or a method of separating a signal varying in synchronization with the AC voltage by lock-in detection or the like.

In the above description, the displacement of the probe 3 is measured. However, it is possible to measure a displacement of the surface of the sample 2. In the following, there is described an example of using a unit in which the optical interference method is used for the displacement measuring unit 400 so as to measure the displacement. A laser beam emitted from a distal end of the light irradiation device 401 irradiates the surface of the sample 2 at a vicinity of the part to which the probe 3 is close, and intensity of interference light with laser beam branched from the light irradiation device 401 and laser beam reflected by the surface of the sample 2 is measured so as to detect a position of the sample surface. Here, the light irradiation by the light irradiation device 401 is performed through an optical fiber, for example. A fiber optical axis at an end portion of the optical fiber is arranged to be substantially perpendicular to the sample surface. Light branched from the incident light and the reflection light returning to the optical fiber interfere on the branched optical path and the interfered light are detected by the optical detector 402 arranged on the branched optical path. The feedback control of the moving unit 12 is performed so that a position on the surface of the sample 2 to be detected becomes constant. Both the probe 3 and the optical fiber are fixed to the apparatus body. Thus, even if the probe 3 scans the surface of the sample 2 having an inclination, by maintaining the distance between the distal end of the probe 3 and the surface of the sample 2 to be constant, the liquid bridge can be formed stably so that stable ionization can be performed.

According to the present invention, it is possible to provide an ionization apparatus for separating and ionizing components in different very small regions on a solid sample surface without mixing the components in the atmosphere, an apparatus for mass spectrograph by using the ionization apparatus, and an apparatus for imaging the component distribution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-160898, filed Aug. 2, 2013, which is hereby incorporated by reference herein in its entirety.

What is claimed is:

1. An ionization apparatus comprising:
a holder configured to hold a sample;
a probe configured to determine a part to be ionized of the sample held by the holder;
an extract electrode configured to extract ionized ions of the sample;
a liquid supply unit configured to supply liquid to a part of a region of the sample; and
a unit configured to apply a first voltage between the probe and the extract electrode,
wherein the first voltage is pulse-modulated.

2. The ionization apparatus according to claim 1, wherein a liquid bridge is formed between an end portion of the probe and the sample held by the holder.

3. The ionization apparatus according to claim 1, further comprising a unit configured to apply a second voltage between the probe and the holder.

4. The ionization apparatus according to claim 3, wherein the second voltage is pulse-modulated.

5. The ionization apparatus according to claim 4, wherein the pulse-modulated first voltage and the pulse-modulated second voltage are applied in synchronization with each other.

6. The ionization apparatus according to claim 5, wherein a time period is set, in which one of the first voltage and the second voltage is only applied.

7. The ionization apparatus according to claim 6, wherein the second voltage is lower than the first voltage.

8. The ionization apparatus according to claim 1, further comprising a displacement measuring unit configured to measure a displacement of the probe or the sample,
wherein a feedback control of a position of a moving unit for displacing a position of the sample in a direction perpendicular to a surface of the sample is performed based on a signal from the displacement measuring unit.

9. A mass spectrometer comprising:
an ionization unit comprising the ionization apparatus according to claim 1; and
a mass spectrometry unit configured to analyze a mass-to-charge ratio of an ion.

10. The mass spectrometer according to claim 9, wherein application of the pulse-modulated first voltage and measurement by the mass spectrometry unit are synchronized with each other.

11. The mass spectrometer according to claim 9, wherein the mass spectrometry unit comprises a time-of-flight mass spectrometry unit.

12. The mass spectrometer according to claim 11, wherein the application of the pulse-modulated first voltage and measurement of time of flight by the time-of-flight mass spectrometry unit are synchronized with each other.

13. The mass spectrometer according to claim 12, wherein a time interval of application of series of pulses of the pulse-modulated first voltage is longer than a time period for measuring the time of flight by the time-of-flight mass spectrometry unit.

14. An image forming system, comprising:
the mass spectrometer according to claim 9; and
an image forming apparatus comprising:
an image forming unit configured to form image information for displaying a distribution image of components of substances contained in the sample based on mass information analyzed by the mass spectrometer and position information of the part of the region on the sample surface; and
an image display unit configured to output the image information to a display apparatus.

* * * * *